(12) United States Patent
Martinez Canedo et al.

(10) Patent No.: US 8,799,880 B2
(45) Date of Patent: Aug. 5, 2014

(54) PARALLELIZATION OF PLC PROGRAMS FOR OPERATION IN MULTI-PROCESSOR ENVIRONMENTS

(75) Inventors: Arquimedes Martinez Canedo, Princeton, NJ (US); Mohammad Abdullah Al Faruque, Plainsboro, NJ (US); Mitchell Packer, Yardley, PA (US); Richard Freitag, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 141 days.

(21) Appl. No.: 13/420,691

(22) Filed: Mar. 15, 2012

(65) Prior Publication Data
US 2012/0260239 A1      Oct. 11, 2012

Related U.S. Application Data

(60) Provisional application No. 61/473,344, filed on Apr. 8, 2011.

(51) Int. Cl.
*G06F 9/45* (2006.01)
*G05B 19/18* (2006.01)
*G05B 19/05* (2006.01)

(52) U.S. Cl.
CPC .................... *G06F 8/456* (2013.01); *G05B 19/05* (2013.01)
USPC ................................. 717/149; 700/4; 700/86

(58) Field of Classification Search
USPC ......................................................... 717/149
See application file for complete search history.

(56) References Cited

U.S. PATENT DOCUMENTS

| | | | | |
|---|---|---|---|---|
| 5,146,594 A * | 9/1992 | Iitsuka | | 717/156 |
| 5,414,849 A * | 5/1995 | Yamamoto | | 717/149 |
| 5,644,487 A * | 7/1997 | Duff et al. | | 700/56 |
| 5,896,289 A * | 4/1999 | Struger | | 700/9 |
| 6,253,371 B1 | 6/2001 | Iwasawa et al. | | |
| 7,765,536 B2 | 7/2010 | Gordy et al. | | |
| 7,882,498 B2 | 2/2011 | Ottoni et al. | | |
| 2002/0198607 A1* | 12/2002 | Johnson et al. | | 700/18 |
| 2003/0171114 A1* | 9/2003 | Hastings | | 455/426.2 |
| 2003/0204641 A1* | 10/2003 | Rehof et al. | | 709/313 |
| 2007/0255929 A1 | 11/2007 | Kasahara et al. | | |
| 2009/0172353 A1 | 7/2009 | Su et al. | | |
| 2009/0234471 A1* | 9/2009 | Chandhoke | | 700/86 |
| 2010/0306733 A1 | 12/2010 | Bordelon et al. | | |

(Continued)

FOREIGN PATENT DOCUMENTS

WO      2010/060243 A1      6/2010

OTHER PUBLICATIONS

Maheshwari et al., Partitioning and scheduling of parallel functional programs using complexity information, May 27, 1991, Advances in Computing and Information ICCI '91, pp. 299-311.

(Continued)

*Primary Examiner* — James D Rutten

(57) ABSTRACT

A method of identifying and extracting functional parallelism from a PLC program has been developed that results in the ability of the extracted program fragments to be executed in parallel across a plurality of separate resources, and a compiler configured to perform the functional parallelism (i.e., identification and extraction processes) and perform the scheduling of the separate fragments within a given set of resources. The inventive functional parallelism creates a larger number of separable elements than was possible with prior dataflow analysis methodologies.

11 Claims, 7 Drawing Sheets

(56) References Cited

U.S. PATENT DOCUMENTS

| | | |
|---|---|---|
| 2010/0306736 A1 | 12/2010 | Bordelon et al. |
| 2010/0306752 A1 | 12/2010 | Bordelon et al. |
| 2011/0077749 A1 | 3/2011 | Shang et al. |

OTHER PUBLICATIONS

Maheshwari, Partitioning and scheduling of parallel functional programs for larger grain execution, Journal of Parallel and Distributed Computing, vol. 26, No. 2, Apr. 15, 1995, pp. 151-165.

* cited by examiner

PARALLELIZATION OF PLC PROGRAMS FOR OPERATION IN MULTI-PROCESSOR ENVIRONMENTS

CROSS-REFERENCE TO RELATED APPLICATIONS

The application claims the benefit of U.S. Provisional Application No. 61/473,344, filed Apr. 8, 2011 and herein incorporated by reference.

TECHNICAL FIELD

The present invention relates to automatic parallelization of standardized industrial automation languages for execution in multi-core processors and, more particularly, to an automatic parallelization technique that relies on both dataflow analysis and functional analysis to create balanced parallelization across multiple processing resources.

BACKGROUND OF THE INVENTION

An industrial control system often includes a programmable logic controller (PLC) for providing coordinated control of industrial control equipment, which includes various elements that are often either sensors for providing inputs to the PLC, or relays for receiving outputs from the PLC, each under the control of an element controller, and each connected to the PLC over a network via a network I/O device. A PLC generally has a processor, a memory, and a number of separate input/output (I/O) modules coupled to the control equipment. The processor is the heart of the PLC and responsible for many PLC functions, such as input scanning, logic solving and output scanning.

As the complexity of industrial systems has increased, the associated PLCs have evolved to utilize embedded software for the coordination of the requisite high-volume and high-precision manufacturing. Industries such as pharmaceutical, chemical, energy and others rely on PLCs that are utilized for sensing, planning complex processes and actuating thousands of times per second through high-speed cameras, light sensors, collision avoidance and detection, robotic devices, motors and the like. These PLCs must not only comply with hard real-time requirements, but must also be able to survive in extreme environments of temperature, pressure, vibration and humidity, while remaining operable for decades without interruption or failure. Throughout the years, embedded software for PLCs has been developed by non-computer experts using domain-specific languages that have been designed and refined by experienced practitioners, manufacturers of automation hardware and software, as well as independent institutions from different industry sectors.

The IEC 61131-3 standard has been widely adopted as the programming standard for PLCs since about 1993, but its languages have been used since the early 1970's. The standard provides a total of five different languages: two textual languages (Instruction List or IL, and Structured Text or ST), two graphical languages (Ladder Diagram or LD, and Function Block Diagram or FBD) and one with both textual and graphical representations (Sequence Function Chart or SFC). Different industry sectors use different languages, or combinations of them, simply because each language has special semantics that facilitate certain automation tasks. These programming languages have been designed to satisfy the needs and increase the productivity of non-computer experts such as electrical, mechanical and chemical engineers.

Flexibility is one of the most important features in industrial PLCs inasmuch as the production requirements change significantly between different products, or different generations of the same product. Therefore, there is an economical and technical motivation to shift from custom architectures and programming languages into flexible off-the-shelf architectures and standardized automation languages.

The adoption of multi-core processors appears to be the next evolutionary step in high-performance control systems, since they offer better energy efficiency, redundancy, consolidation properties and scalable performance than existing systems. Unfortunately, as of today, there is only a very limited understanding on how to compile IEC 61131-3 languages for execution in multi-core processors. US Patent Publication 2011/007749, dated Mar. 31, 2011, describes an initial attempt to introduce PLC systems to the multi-core processor environment. In this arrangement, the various applications associated with the PLC are associated with different processors and operated in parallel. For example, one processor is dedicated to I/O scanning with access to I/O modules, another processor is dedicated to the logic solving that runs the user's program, a third processor is used for communication and a fourth for diagnostics. While this arrangement does utilize multiple processors in parallel, the efficiency of the arrangement is not optimum and there may be considerable periods of time where one or another of the processors is idle while another is over-demanded.

US Patent Publication 2010/0306733 dated Dec. 2, 2010 describes the use of a controller in the form of a general purpose PC with multiple cores. In this case, an automated technique is applied to the data flow program which scans for iterative functionality that allows for the data flow to be partitioned into separate portions. These portions are then distributed across the multiple set of processors to be executed in parallel. Again, while this automatic parallelization of a data flow program is useful in identifying portions that can be assigned to different processors, this partitioning occurs at a relatively high level (i.e., providing a "coarse grain" division), which results in a relatively unbalanced parallelism across the multiple processors.

In this type of analysis, the compilers analyze the program to identify, organize and exploit parallelism by searching for data-independent blocks that can be partitioned and executed in parallel. If a program is written in a slightly obscure or different way, the compiler may fail to recognize one or more locations where partitioning may be applied. Normally, compilers must guarantee that the generated code produces the exact same results that were intended by the programmer. This expected behavior is enforced by the traditional dataflow analysis, which is executed on the compiler's internal representation of the program.

Whenever the dataflow analysis cannot determine if there is a true data dependency, it takes a conservative approach and assumes that a dependency exists, in order to guarantee equivalent semantics in the generated code. In some cases, these data dependencies do not exist in the high-level representation of the program, but have been introduced when translating the program into a lower-level representation that simply understands basic instructions and memory locations.

Thus a need remains for an improved methodology for efficiently implementing PLC programs in a multi-core processor environment.

SUMMARY OF THE INVENTION

The needs remaining in the prior art are addressed by the present invention, which relates to automatic parallelization of standardized industrial automation languages for execution in multi-core processors and, more particularly, to an automatic parallelization technique that relies on both dataflow analysis and functional analysis to create balanced parallelization.

In accordance with the teachings of the present invention, it has been realized that the functional information expressed in the high-level languages associated with IEC 61131-3 (hereinafter simply referred to as "PLC programs" for the sake of clarity and simplicity) can serve as a foundation for uncovering a significant amount of parallelization opportunities for distributing tasks between different resources. Traditional approaches to searching for parallelism in PLC programs have ignored the fact that PLC programs are inherently synchronous, where the concept of "time" can be leveraged to benefit parallel execution. Particularly, there are several library blocks that behave as time delays, where at least one execution cycle is required before the outputs become valid. These blocks therefore effectively break the dependency between input and output. By searching for and recognizing these blocks, the methodology of the present invention creates "slices" within specific function blocks to create distinct segments (fragments), allowing these different fragments to be distributed among the available resources to best utilize the multi-core processor capabilities.

In a preferred embodiment of the present invention, an initial dataflow analysis is performed, similar to the prior art arrangement described above, to ascertain the independent program blocks that do not require inputs or outputs from other blocks. The functional partitioning methodology of the present invention is then applied to each independent program block output from the dataflow analysis process, performing a search of the high-level functional language to find specific function blocks that can be characterized as time delays.

It is another aspect of the present invention to analyze and distribute the fragments across the multiple resources (i.e., across multiple cores in a multi-core processor) in a one-to-many manner that most efficiently utilizes the available resources (i.e., scheduling and load balancing).

In one specific embodiment, the present invention can be defined as a programmable logic controller (PLC) for executing a program written in one or more high-level functional languages including a plurality of resources for executing various portions of the program, at least one memory coupled to the processors, and a compiler for performing functional parallelism by: parsing the program into a plurality of program organization units (POUs); identifying blocks within the high-level functional languages of each POU that include one or more time delays such that operations before and after the time delays can be executed in parallel; creating program fragments as partitioned by the identified time delays; and scheduling the program fragments across the plurality of resources to be executed in parallel.

In another embodiment, the present invention defines a method of creating parallelism in a PLC program to provide parallel execution of various segments of the PLC program across a plurality of separate resources comprising the steps of: (1) evaluating a high-level functional representation of the PLC program; (2) performing function block parallelism by identifying locations within the high-level functional representation of a time delay between an input and an output of a function block; and (3) separating the identified locations into program fragments that may be executed in parallel in different resources of the plurality of separate resources.

Advantageously, the creation of additional occurrences of parallelism and the ability to allocation the program fragments across separate resources provides optimization of the PLC program in terms of one or more of the following: minimizing processing time, minimizing power consumption, maximizing CPU utilization, maximizing throughput and avoiding "starvation" (i.e., idle time of a CPU).

Other and further aspects of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
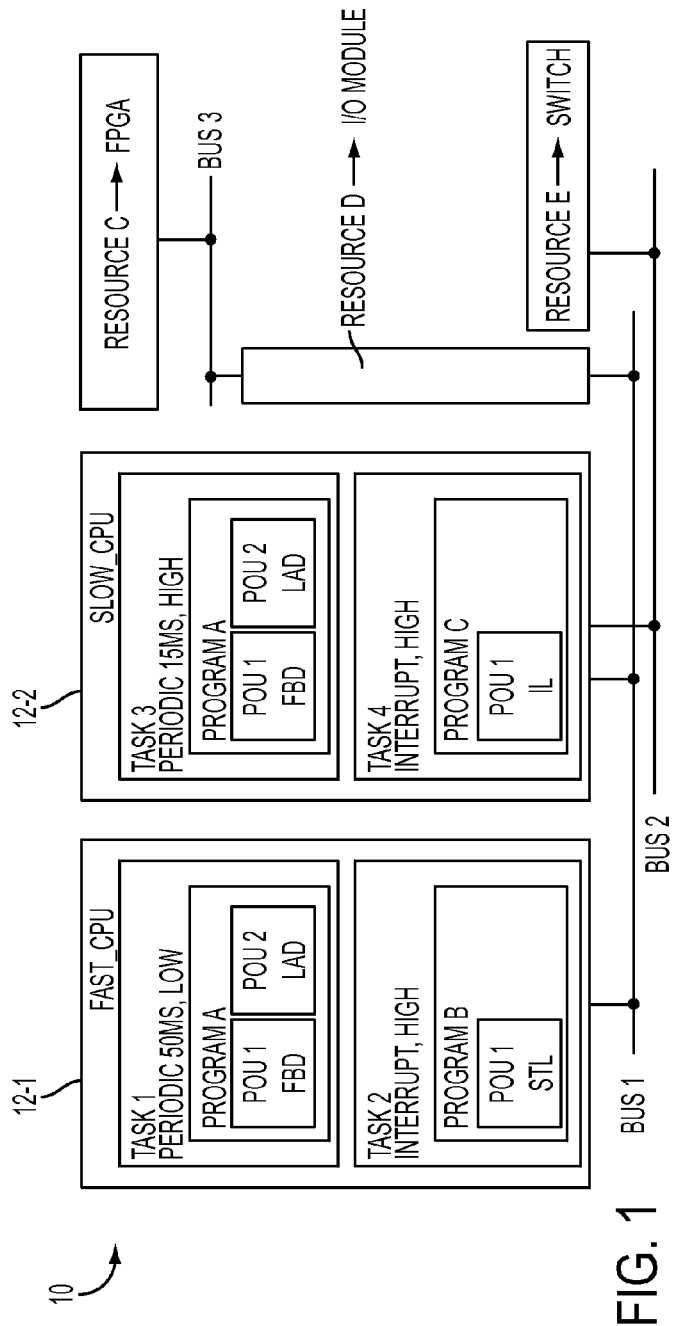
FIG. 1 illustrates an exemplary user application that may be subjected to the automatic parallelization technique of the present invention.

As will be described in detail hereinbelow, the present invention is directed to a method for automatically identifying and extracting parallelism from PLC programs written in high-level languages, the extracted parallelism preferably from both dataflow analysis and functional analysis, although the functional analysis of the present invention can indeed be performed independent of a dataflow analysis. These separate program fragments (tasks or sub-tasks) can then be assigned to different resources (such as different cores in a multi-core processor) and provide a well-balanced, efficient utilization of today's parallel processing environment.

Indeed, a significant aspect of the present invention is the realization that the functional information expressed in the high-level languages associated with IEC 61131-3 (hereinafter simply referred to as "PLC programs" for the sake of clarity and simplicity) can serve as a foundation for uncovering a significant amount of parallelization opportunities for distributing tasks between different resources. Traditional approaches to searching for parallelism in PLC programs have ignored the fact that PLC programs are inherently synchronous, where the concept of "time" can be leveraged to benefit parallel execution. Particularly, there are several library blocks that behave as time delays, where at least one execution cycle is required before the outputs become valid. These blocks therefore effectively break the dependency between input and output. By searching for and recognizing these blocks, the methodology of the present invention creates "slices" within specific function blocks to create distinct segments (fragments), allowing these different fragments to be distributed among the available resources to best utilize the multi-core processor capabilities.

In accordance with the present invention, the term "functional analysis" refers to the high-level behavior of a program. For example, the LAD programming language provides a "flip-flop" operand that can be used to "store information over time". A traditional compiler would translate the flip-flop operand into a sequence of basic instructions that after optimization may be re-ordered and interleaved with other instructions or sequences of instructions. In contrast, the present invention uses the high-level functional information about the flip-flop operand to optimize and slice the program for parallel processing. As mentioned above, PLC programs are inherently synchronous and therefore the concept of time can be leveraged to break the intra-iteration data dependencies that traditional dataflow analysis would conservatively honor. A flip-flop is considered to be exemplary only of the type of function block that can be defined as inserting a "time delay" into a PLC program (i.e., a library block that requires at least one execution cycle before the output becomes valid) and that can be used to partition a single function block into a number of separate tasks and/or sub-tasks (collectively referred to as "fragments"). Other function blocks in this category include simultaneous divergence blocks and asynchronous function calls.

FIG. 1 illustrates an exemplary user application 10 that may be described and understood as benefitting from the automatic parallelization method of the present invention. The arrangement in this case includes a pair of resources 12-1 and 12-2 (e.g., a pair of single processor PLCs) that are used to execute several tasks, shown as Task 1, Task 2, Task 3 and Task 4 in FIG. 1. In this particular example, resource 12-1 is defined as a "fast CPU" and resource 12-2 is defined as a "slow CPU". As shown and shown in FIG. 1, each task is an instantiation of a program (with Programs A and B shown in application 10), and each program comprises one or more Program Organization Units (POUs). As noted, the different POUs within application 10 may be written in different languages. The parallelization technique of the present invention is able to search the high-level functional language of the various POUs and find opportunities to "break" the POUs into fragments that can be executed in parallel across multiple resources.

The configuration shown in FIG. 1 contains the information about the allocation of programs into tasks with different properties, and in this example allocates Task 1 and Task 2 to resource 12-1, and Task 3 and Task 4 to resource 12-2. Each task has an associated program and includes a tuple that specifies the synchronous behavior? (or synchronicity?) and priority configuration. For example, Task 1 executes periodically every 50 ms and has a "low" priority, while Task 2 executes only when an interrupt triggered by an I/O occurs and has a "high" priority.

Once the configuration and the user program are specified, including the mapping of variables to physical addresses (not shown in FIG. 1), the POUs and configuration are translated into machine code for the specific architecture and sent to the devices for execution.

Figure 2:
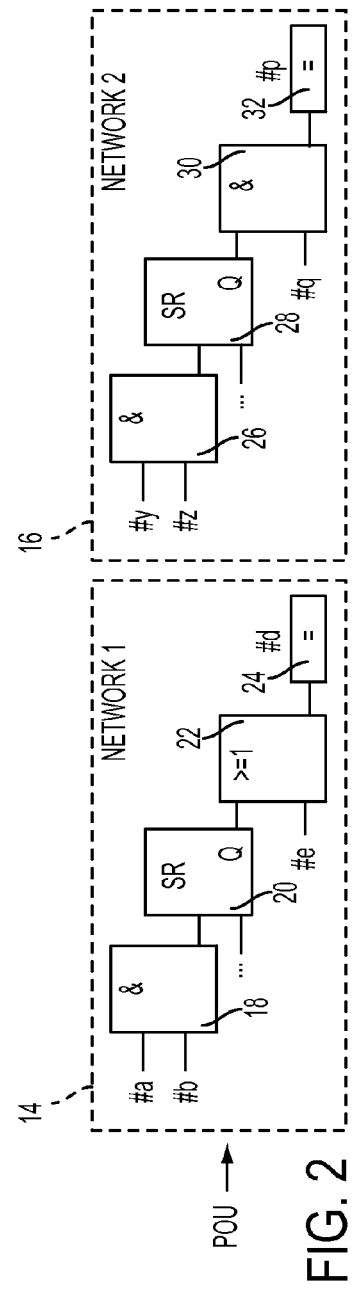
FIG. 2 shows a specific program organization unit (POU) that has been identified by prior art dataflow analysis as containing two separate network elements.

In this case, the availability of two separate PLCs (resources 12-1 and 12-2) allows for the separate programs to be assigned to the separate processors, creating a certain level of optimization of resource allocation. Stated another way, this existing model acknowledges concurrency at the program level by allowing different programs (A, B, . . .) to run on different resources through a one-to-one allocation. FIG. 2 illustrates this concept for an exemplary POU consisting of two networks 14 and 16, where data in the system flows from left to right. Network 14 includes a logic AND element 18, calculating the AND operation based on inputs "a" and "b", and then storing the result in a flip-flop memory location 20. The output of flip-flop 20 is thereafter combined with an input "e" in an OR element 22 and the result stored in location 24. Network 16 operates in a similar fashion, with a logic AND element 26 responsive to inputs "y" and "z", storing the result in a flip-flop memory location 28. The output of flip-flip 28 is combined with an input "q" in a second AND element 30, and the result stored in location 32.

In performing a dataflow analysis of networks 14 and 16, it is found that network 14 is not producing any value that is consumed by network 16, nor is network 14 consuming any value produced by network 16. This data independence thus guarantees that network 14 can be executed in parallel with network 16, with this parallelism illustrated by the dotted lines in FIG. 2. If a system has multiple resources (e.g., cores in a multi-core processor), this particular POU can be mapped in a one-to-many fashion by assigning each network to a different resource. Everything within a defined network can be executed in parallel to the other operations in the remaining network. However, the data dependencies within each network must be honored. This prior art dataflow analysis approach has thus been able to create a modest degree of parallelism in PLC programs.

The present invention provides yet another level of parallelization by developing a methodology in which a single POU can be executed on multiple resources through a one-to-many allocation. In particular, it has been realized that the high-level programming languages utilized by a PLC include domain-specific semantics that facilitate the exploitation of a different type of parallelism that is orthogonal to the parallelism found by the dataflow analysis described above. The type of parallelism exploited by the present invention is referred to as "functional", since it uses domain-specific semantics found in the high-level functional language that describe "purpose" or "intent" of a specific action in a PLC program. Indeed, a significant aspect of the present invention relates to the ability to recognize and implement functional parallelism in addition to dataflow parallelism, resulting in the ability to partition POUs into even "finer" segments, creating the possibility to load balance across the resources in an improved manner.

Figure 3:
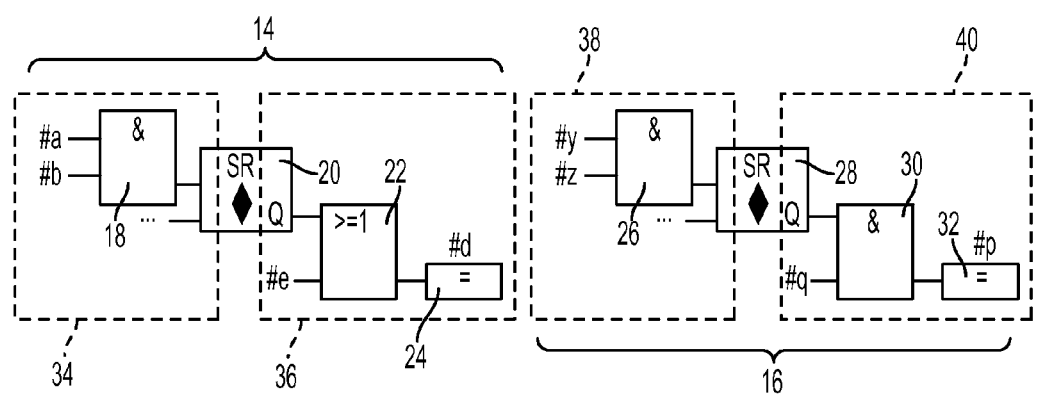
FIG. 3 is an illustration of the application of functional parallelism in accordance with the present invention to the network elements of FIG. 2, creating a set of four separate program fragments that may be executed in parallel.

Reference is made to flip-flops 20 and 28 in FIG. 2, whose function is to store "state" information. The operational behavior of these elements is to delay the outputs (state) one execution cycle. Therefore, since the flip-flop inputs are decoupled from their associated outputs, this information can be used to break the computation flow within both networks 14 and 16. This is shown in FIG. 3, where diamonds within flip-flops 20 and 28 are used to illustrate the "break" in the time flow within each network. As a result, networks 14 and 16 can each be partitioned into two separate fragments, network 14 shown as comprising fragments 34 and 36, and network 16 shown as comprising fragments 38 and 40. In accordance with the present invention, inasmuch as these four fragments are all decoupled, they can be executed in parallel in multiple processing units.

Thus, while the dataflow analysis identifies two parallel regions resulting in networks 14 and 16 as shown in FIG. 2, the functional parallelization technique of the present invention identifies an additional opportunity to partition the blocks at the time "breaks" associated with flip-flops 20 and 28, as shown in FIG. 3. In combination, the two parallelization techniques partition the program into four fragments that may be concurrently processed within the same execution cycle; that is, these four fragments can be executed in parallel in different resources. The dataflow analysis can be thought of slicing the program "horizontally" into tasks, with the functional analysis slicing the program "vertically" into sub-tasks. The two analyses, in combination, provide a two-dimensional parsing of the program into parallel fragments.

Figure 4:
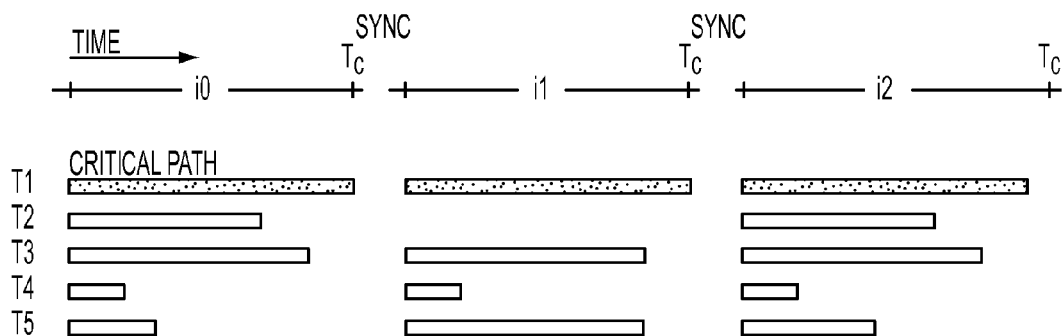
FIG. 4 is a diagram illustrating three separate iterations of an exemplary PLC program that includes five separate tasks, T1-T5.

While this analysis is associated with only a single "pass" through networks 14 and 16, it is to be understood that PLC programs are executed periodically, where the user can select the sampling rate and organize the program into blocks for which the different sampling rates can be specified. FIG. 4 shows three iterations, denoted $i_0$, $i_1$ and $i_2$, of an exemplary PLC program. Tasks T1, T2, T3, T4 and T5 have been identified by a dataflow analysis as separate partitions of one or more POUs that are data independent and can be executed in parallel. As shown in FIG. 4, task T2 is running only on even iterations ($i_0, i_2, \ldots$) and task T5 has a variable workload. The cycle time, shown as $T_c$, represents the time that is defined by the user for the set of tasks to complete. Execution time is defined as the time it takes to execute T1-T5, including the "read" of inputs, data processing and "write" to outputs. The time between the completion of the tasks and the beginning of the next cycle is defined as "sleep" time, where the resources are idle.

As mentioned above, the main advantage of parallelizing industrial PLC applications is a reduction of the associated cycle time and, therefore, an improvement of the response time of the application to the environment. Typically, the faster an application is able to interact with the environment, the better it is for the control algorithms. However, a common problem when attempting to parallelize a program using only dataflow analysis is that the tasks are usually imbalanced and the longest task (critical path) bounds the performance in a parallel execution environment. In the example of FIG. 4, task T1 is shown to define the "critical path". Indeed, if the length of the critical path is 50% of the total execution time, then the maximum increase in processing speed is only twice that of the original, even if there are an infinite number of available resources.

Figure 5:
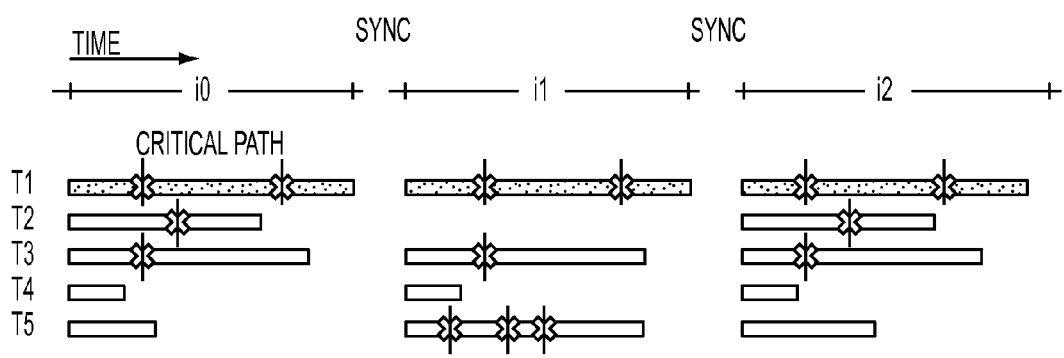
FIG. 5 is a revised version of the diagram of FIG. 4, in this case illustrating the application of functional parallelism of the present invention to each task, creating a number of fragments that may be separately scheduled across multiple resources.

In accordance with the present invention, therefore, a substantial benefit arises from the ability to find function block "breaks" associated with the task(s) creating the critical path during a program's execution cycle. The ability to partition a critical path into separate fragments thus allows for these fragments to be executed in parallel and significantly reduce the critical path length. FIG. 5 illustrates the result of applying the functional parallelization technique to the set of tasks as previous described in association with FIG. 4. In this case, task T1 has been found to be separable into three fragments, as shown by the X's along the timeline of task T1. Obviously, the functional parallelization of the present invention is applied to each identified task, not only the one associated with the critical path. In this particular example, tasks T2 and T3 are both shown as being separable into a pair of fragments. In each instance, the process of the present invention has discovered a function block in the form of a flip-flop, asynchronous function block, simultaneous divergence, or the like, and flags this as a location where the flow can be broken and the separate fragments can be executed on separate resources.

An important observation to understanding the method of the present invention is that at a "current" iteration, data dependencies associated with the above-mentioned function blocks are weak and can be safely ignored, since their results are used in the following iterations, not the current iteration. Therefore, these broken data dependencies allow the compiler to slice the task into subtasks (fragments), as indicated by the X's in FIG. 5. While the existing dataflow analysis has sliced the program into tasks, the method of the present invention finds a complementary synchronous parallelism that is orthogonal to the dataflow analysis, where the dataflow analysis can be thought of as dividing the program "horizontally" into tasks and the method of the present invention divides the program "vertically" into sub-tasks.

Figure 6:
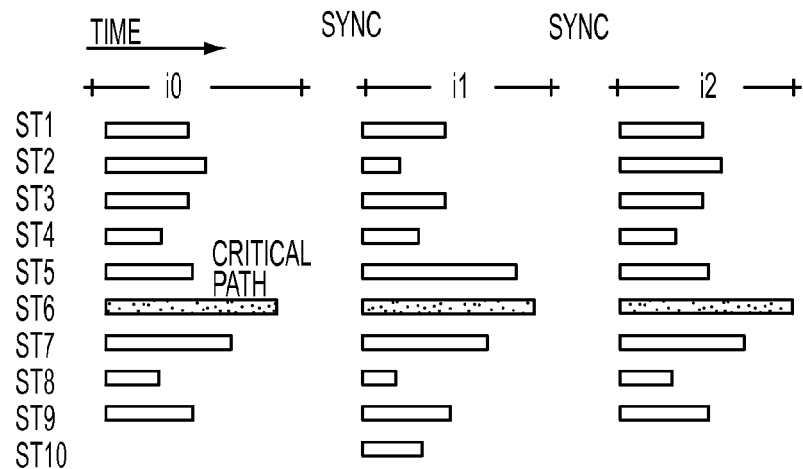
FIG. 6 is a listing of all of the fragments (sub-tasks) created in association with the arrangement of FIG. 5.

FIG. 6 illustrates the results of implementing the functional parallelization on the tasks in the manner shown in FIG. 5, where FIG. 6 is a listing of the generated sub-tasks (i.e., "fragments") denoted ST1-ST10 (with only the odd iterations, such as $i_1$, having the full number of ten sub-tasks). It is noted that the cycle time $T_c$ has been reduced when compared to the initial value shown in FIG. 4, as a result of reducing the length of the critical path (now associated with sub-task ST6).

While the ability to provide this finer-grain partitioning of programs allows for multi-core processors to be used more efficiently is a significant benefit in and of itself, a further advantage can be achieved by ascertaining the most efficient way in which to allocate these POU fragments across a given set of resources. The first step in this allocation process is to characterize the performance of the resources in a latency model, which takes into account the topology of the network to calculate communication latencies and computational capacities of its execution nodes. Different heuristics for parallel scheduling can be used to allocate the functional fragments into the multiple resources, taking into account the latency model such that the execution time of the application is reduced.

Figure 7:
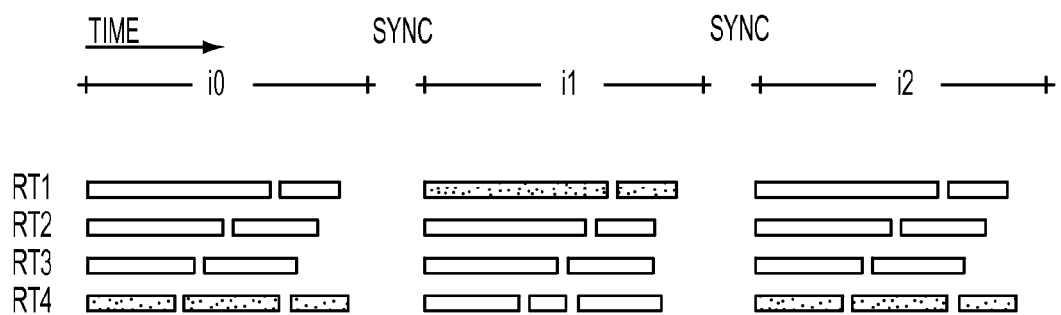
FIG. 7 illustrates one exemplary "one-to-many" scheduling of the fragments shown in FIG. 6 across a set of four separate resources R1-R4.

The method of the present invention is considered to be schedule agnostic inasmuch as it simply finds additional parallelism that is hidden in the synchronous dimension. The final schedule then needs to be created based upon by the underlying implementation. One exemplary final schedule is shown in FIG. 7, which is based upon the availability of four separate resources R1, R2, R3 and R4 (e.g., a 4-core processor), where it is assumed that the operational capabilities of the resources are identical. The scheduling of the computation across the four resources can be performed by multi-processor scheduling and is defined as an NP-hard optimization problem. An exemplary set of system characterizations includes: minimizing processing time, minimizing power consumption, maximizing resource utilization, maximizing throughput and avoiding "starvation" of one of more resources by underutilization.

PLCs utilize a very strict execution model based on tasks and POUs in which user programs are organized and executed. What makes the PLC execution scheme so unique is the prioritization of the execution of the tasks. That is, a higher priority task interrupts the execution of all lower priority tasks. A task may run uninterrupted only if it has the highest priority or completes. Thus, executing PLC programs in a multi-core processor environment requires careful prioritization of tasks such that the original semantics of the PLC program are honored, as will be discussed below in association with the one-to-many process flowchart of FIG. 10.

Figure 8:
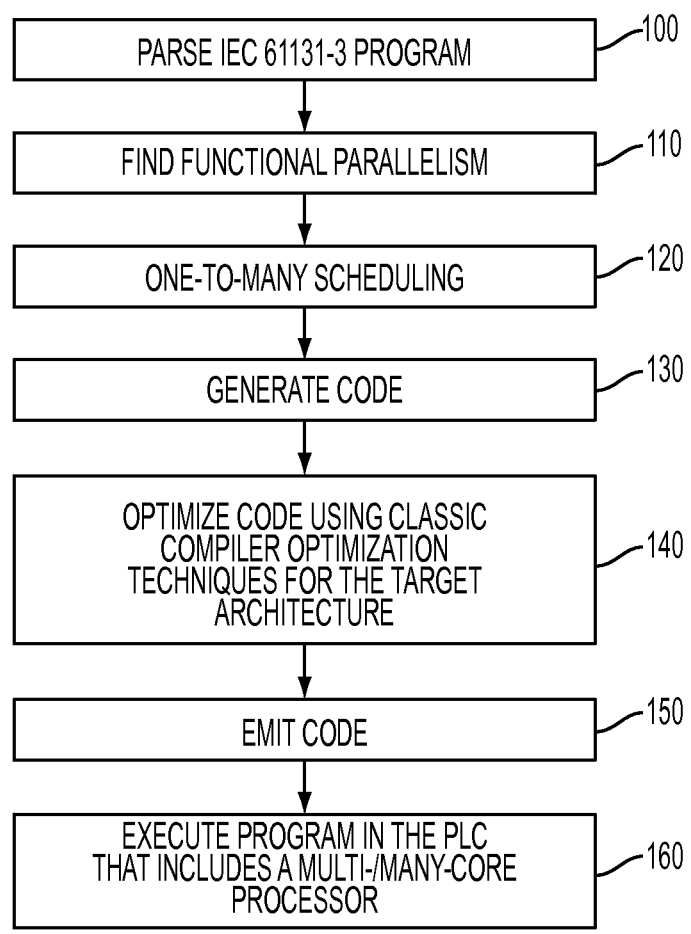
FIG. 8 is an overall flowchart of an exemplary compilation of a PLC program utilizing functional parallelism in accordance with the present invention.
Figure 9:
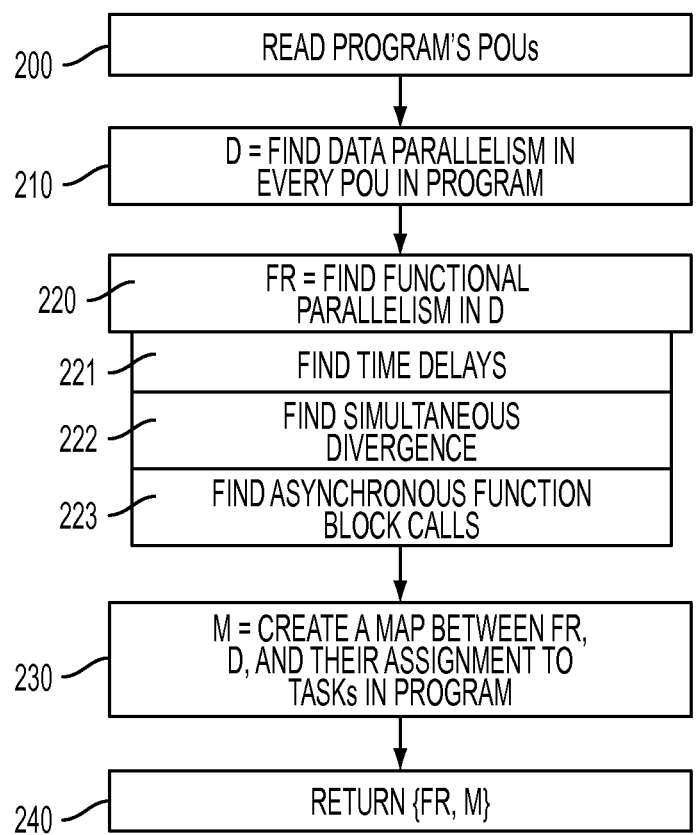
FIG. 9 is a flowchart of a particular sequence of steps that may be used to provide both dataflow analysis and functional analysis to create both types of parallelism and create program fragments in accordance with the present invention.

FIG. 8 is a high-level flow chart illustrating the utilization of the automatic parallelization of a PLC program in accordance with the present invention. As shown, the process begins at step 100 by parsing the PLC program into POUs. Next, the automatic parallelization process of the present invention is invoked in step 110 to parse each POU into all possible fragments, using both dataflow analysis and functional analysis to identify all sub-task fragments. A flowchart of the parallelization process is shown in FIG. 9 and will be described hereinbelow.

Referring again to FIG. 8, once all of the program fragments have been identified, the process continues by implementing one-to-many scheduling in step 120, where the program fragments are allocated across the available resources. An exemplary one-to-many scheduling process is shown in detail in FIG. 10.

Subsequent to the allocation of fragments across the multiple resources, the high-level PLC language is translated into an intermediate representation (step 130) that is used by a compiler as an intermediate step before generating assembly or machine language code. Conventional optimization techniques can then be employed in step 140 to reduce the instruction set (i.e., common subexpression elimination, dead code elimination, register allocation, etc.). The optimized code is sent to the processor for execution in step 150, where the use of a multi-core processor (resources) in accordance with the present invention involves the creation of multiple threads. Lastly, the program is executed as shown in step 160.

As noted above, FIG. 9 is a flowchart showing an exemplary set of detailed steps that may be executed in performing step 110 (the parallelization process of the present invention). The process begins at step 200 by reading each POU that has been identified in step 100 of the program flow as shown in FIG. 8. Subsequently, a conventional dataflow analysis is performed on each POU in step 210 to identify all data-independent blocks D1-DN within each POU in the manner defined above. Once identified, each data-independent block Di is then evaluated to identify functional parallelism in accordance with the teachings of the present invention (step 220).

In the specific flowchart representation of FIG. 9, three different types of function blocks are searched for: time delays (step 221), occurrences of simultaneous divergence (step 222) and asynchronous function block calls (step 223). Each identification is then labeled as a separate program fragment FR. The process continues with, in this example, creating a map M between each fragment FR, its data block D and the associated task in the original program (step 230). Mapping the functional parallelism to the original program structure is important inasmuch as the tasks each have a defined priority and time constraint, as mentioned above. Lastly, the ordered pairs (FR,M) are then returned to step 120 in the main program (flowchart of FIG. 8) in step 240.

Figure 10:
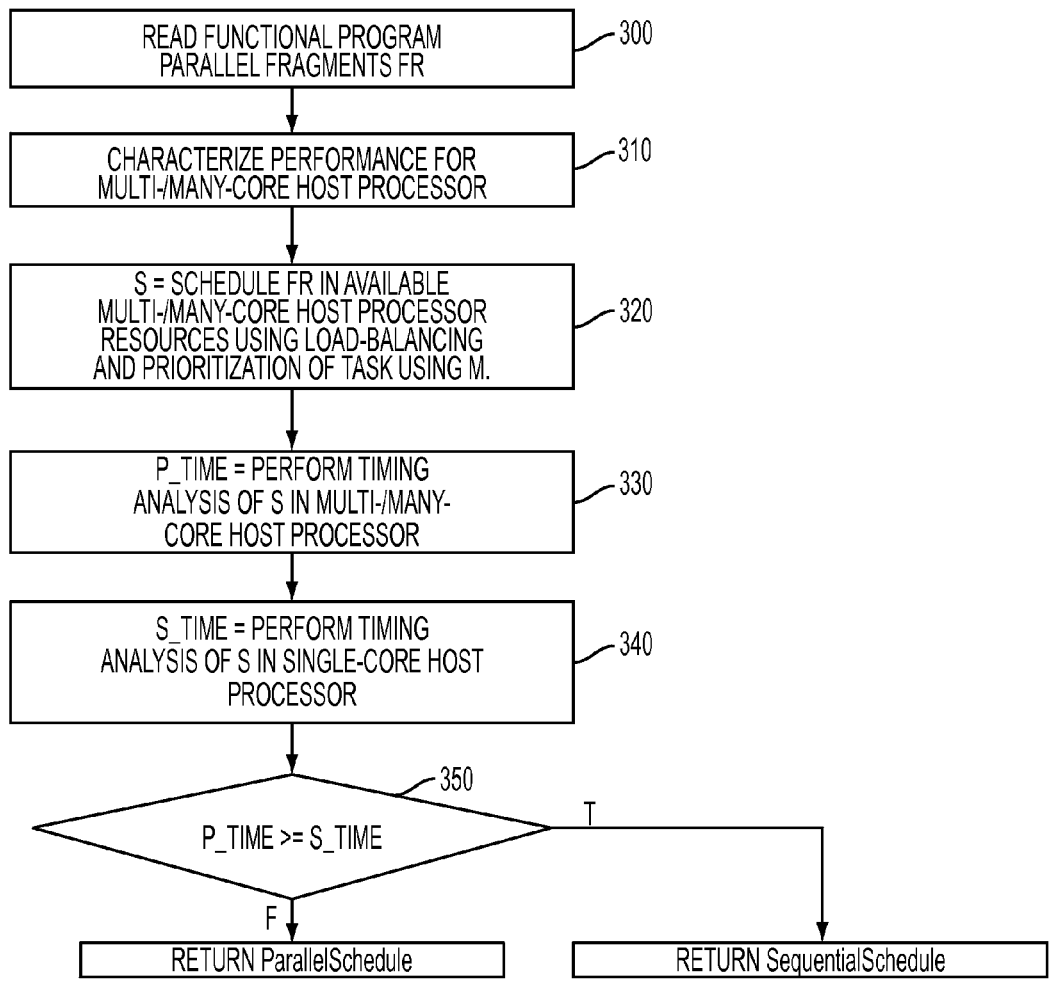
FIG. 10 is a flowchart of an exemplary sequence of steps that may be used to distribute the created program fragments across multiple resources, in accordance with the present invention.

FIG. 10 illustrates an exemplary one-to-many scheduling process that may be utilized as step 120 in the overall process (as shown in the flowchart of FIG. 8) in accordance with the present invention. It is to be understood that the specifics of the flow in FIG. 10 are meant to describe only an example of a suitable process flow; other methods of performing one-to-many scheduling may be used to efficiently allocate the various program fragments FR across a given set of resources.

Referring to FIG. 10, the process begins by inputting the program fragments FR in step 300. The following steps are then performed for each fragment in turn. First, the available resources are characterized (step 310) in terms of their performance (i.e., latency model), which takes into account the topology of the network to calculate communication latencies and computational capacities of each resource. Next, a scheduling time S is associated with each fragment in step 320, based upon load balancing and prioritization of the specific fragment's task using the map M created in step 230 of the parallelization process (see FIG. 9). Once the scheduling has been identified, a timing analysis for each fragment is performed in both the multi-core environment (step 330), defining a "parallel" time (P_Time) and a single-core environment (step 340), defining a "single" time (S_Time). The times are then compared in step 350, where if the parallel time is greater than the single time, a "sequential" schedule is returned to the main program (step 360). Otherwise, if the parallel time is less than the single time, a "parallel" schedule is returned (step 370), with the assumption being that in most cases the parallel time will be less than the single time.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein provided may occur to persons skilled in the art using no more than routine experimentation, and all such modifications and equivalents are believed to be within the spirit and scope of the disclosure as defined by the following claims.

What is claimed is:

1. A programmable logic controller (PLC) for executing a program written in one or more high-level functional languages, the controller comprising a plurality of resources for executing various portions of the program; and a compiler including a processor and non-transitory computer readable media containing instructions that, when executed by the processor, perform functional parallelism by:

parsing the program into a plurality of program organization units (POUs);

identifying blocks within the high-level functional languages of each POU that include one or more time delay functions that delay an output by one execution cycle, such that operations before and after the time delay functions can be executed in parallel;

partitioning at least one of the blocks into first and second program fragments by separating at an identified time delay function, the first and second fragments comprising operations before and after the identified time delay function, respectively; and scheduling the first and second program fragments across separate processor resources of the plurality of resources to be executed concurrently.

2. The PLC as defined in claim 1 wherein the plurality of resources comprises a plurality of cores within a multi-core processor.

3. The PLC as defined in claim 1 wherein the high-level languages include one or more languages selected from the group consisting of: textual languages including Instruction List (IL) and Structured Text (ST), graphical languages including Ladder Diagram (LD) and Function Block Diagram (FBD) and Sequence Function Chart (SFC) language including with both textual and graphical representations.

4. A method of creating parallelism in a PLC program to provide parallel execution of various segments of the PLC program across a plurality of separate resources, the method comprising the steps of:

performing a functional analysis on a high-level functional representation of the PLC program by identifying locations of time delay functions within the high-level functional representation between an input and an output of a function block, the time delay function delaying an output by one execution cycle;

partitioning, using at least one memory coupled to at least one processor, the high-level functional representation of the PLC program into first and second program fragments by separating the representation at the identified locations into program fragments that may be executed concurrently in separate resources of the plurality of separate resources, the first and second program fragments comprising operations before and after the identified time delay.

5. The method as defined in claim 4 further comprising the step of performing dataflow analysis by identifying data-independent blocks within the high-level functional representation that may be separated and executed in parallel in different resources of the plurality of separate resources.

6. The method as defined in claim 5 wherein the dataflow analysis is performed prior to the functional analysis, the functional analysis performed on each identified data-independent block.

7. The method as defined in claim 4 wherein the time delay functions are identified by searching for a block selected from the set of: flip-flops, simultaneous divergence blocks and asynchronous function blocks.

8. The method as defined in claim 4 wherein the method further comprises the step of:

assigning the plurality of created program fragments to various ones of the resources within the plurality of separate resources such that program fragments execute in parallel.

9. The method as defined in claim 8, wherein in performing the assignment, the allocation is performed to optimize a system characteristic.

10. The method as defined in claim 9 wherein the optimized system characteristic is selected from the group consisting of: minimizing processing time, minimizing power consumption, maximizing resource utilization, maximizing throughput and avoiding underutilization of selected resources.

11. The method as defined in claim 8 wherein in determining an execution time for each program fragment, an analysis of the execution time for running on a single processor is compared to the execution time for running on a processor in a multiple processor environment, and the shorter time and processor assignment is selected accordingly.

* * * * *